United States Patent
Khachaturian et al.

(10) Patent No.: US 11,336,373 B2
(45) Date of Patent: May 17, 2022

(54) CO-PRIME OPTICAL TRANSCEIVER ARRAY

(71) Applicant: California Institute of Technology, Pasadena, CA (US)

(72) Inventors: Aroutin Khachaturian, Pasadena, CA (US); Seyed Ali Hajimiri, Pasadena, CA (US); Behrooz Abiri, Pasadena, CA (US); Seyed Mohammadreza Fatemi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/917,536

(22) Filed: Mar. 9, 2018

(65) Prior Publication Data

US 2019/0089460 A1    Mar. 21, 2019

Related U.S. Application Data

(60) Provisional application No. 62/469,106, filed on Mar. 9, 2017.

(51) Int. Cl.
*H04B 10/00*    (2013.01)
*H04B 10/40*    (2013.01)
(Continued)

(52) U.S. Cl.
CPC .......... *H04B 10/40* (2013.01); *G01S 7/4817* (2013.01); *G01S 17/89* (2013.01); *H04B 10/11* (2013.01);
(Continued)

(58) Field of Classification Search
CPC .......... H01L 27/14625; H01L 25/167; H04B 10/116; H04B 10/40; H04B 10/1123;
(Continued)

(56) References Cited

U.S. PATENT DOCUMENTS

| 4,686,533 A | 8/1987 | MacDonald et al. |
| 4,833,336 A | 5/1989 | Kraske |

(Continued)

FOREIGN PATENT DOCUMENTS

| CN | 1819485 A | 8/2006 |
| CN | 1902763 A | 1/2007 |

(Continued)

OTHER PUBLICATIONS

U.S. Appl. No. 15/728,329, Response to Final Office Action filed Jan. 16, 2019.

(Continued)

*Primary Examiner* — Hibret A Woldekidan
(74) *Attorney, Agent, or Firm* — Ardeshir Tabibi; Weaver Austin Villeneuve & Sampson LLP

(57) ABSTRACT

A co-prime transceiver attains higher fill factor, improved side-lobe rejection, and higher lateral resolution per given number of pixels. The co-prime transceiver includes in part, a transmitter array having a multitude of transmitting elements and a receiver array having a multitude of receiving elements. The distance between each pair of adjacent transmitting elements is a first integer multiple of the whole or fraction of the wavelength of the optical. The distance between each pair of adjacent receiving elements is a second integer multiple of the whole or fraction of the wavelength of the optical signal. The first and second integers are co-prime numbers with respect to one another. The transceiver is fully realizable in a standard planar photonics platform in which the spacing between the elements provides sufficient room for optical routing to inner elements.

4 Claims, 9 Drawing Sheets

(51) Int. Cl.
- *G01S 7/481* (2006.01)
- *G01S 17/89* (2020.01)
- *H04B 10/11* (2013.01)
- *H04B 10/112* (2013.01)

(52) U.S. Cl.
CPC ........ *H04B 10/1123* (2013.01); *G01S 7/4811* (2013.01)

(58) Field of Classification Search
CPC ...... H04B 10/50; H04B 10/61; H04B 10/801; H04B 10/506; H04B 10/11; H04B 10/25752; H04B 10/548; H04B 10/503; H04B 10/1143; H04B 10/1141; G01S 7/4817; G01S 17/89; G01S 7/4811; H01Q 3/2676; H01Q 21/061
USPC ................ 398/135, 115, 116, 130, 140, 188
See application file for complete search history.

(56) References Cited

U.S. PATENT DOCUMENTS

| | | | |
|---|---|---|---|
| 6,424,442 B1 | 7/2002 | Gfeller et al. | |
| 6,894,550 B2 | 5/2005 | Trosa et al. | |
| 7,313,295 B2* | 12/2007 | Ghandi | G02B 6/266 385/16 |
| 7,539,418 B1 | 5/2009 | Krishnamoorthy et al. | |
| 7,623,783 B2* | 11/2009 | Morris | H04B 10/801 398/131 |
| 8,244,134 B2* | 8/2012 | Santori | H04B 10/803 398/118 |
| 8,311,417 B1 | 11/2012 | Poggiolini et al. | |
| 9,325,419 B1 | 4/2016 | Kato | |
| 9,557,585 B1 | 1/2017 | Yap et al. | |
| 10,382,140 B2 | 8/2019 | Fatemi et al. | |
| 10,795,188 B2 | 10/2020 | Aflatouni et al. | |
| 10,942,273 B2 | 3/2021 | Fatemi et al. | |
| 2002/0174660 A1 | 11/2002 | Venkatasubramanian | |
| 2002/0181058 A1* | 12/2002 | Ger | H04B 10/801 398/164 |
| 2003/0090775 A1 | 5/2003 | Webb et al. | |
| 2004/0071386 A1 | 4/2004 | Nunen et al. | |
| 2004/0101227 A1 | 5/2004 | Takabayashi et al. | |
| 2004/0141753 A1 | 7/2004 | Andreu-von Euw et al. | |
| 2005/0084213 A1 | 4/2005 | Hamann et al. | |
| 2005/0138934 A1 | 6/2005 | Weigert et al. | |
| 2005/0205762 A1 | 9/2005 | Feldman et al. | |
| 2006/0034609 A1 | 2/2006 | Morris et al. | |
| 2006/0056845 A1 | 3/2006 | Parsons et al. | |
| 2006/0188194 A1 | 8/2006 | Ghandi et al. | |
| 2008/0111755 A1 | 5/2008 | Haziza et al. | |
| 2008/0181550 A1 | 7/2008 | Earnshaw | |
| 2009/0297092 A1 | 12/2009 | Takahashi | |
| 2010/0054653 A1 | 3/2010 | Carothers | |
| 2010/0158521 A1 | 6/2010 | Doerr et al. | |
| 2010/0187402 A1 | 7/2010 | Hochberg et al. | |
| 2010/0226658 A1 | 9/2010 | Fujimoto et al. | |
| 2010/0279537 A1 | 11/2010 | Andrade | |
| 2011/0052114 A1 | 3/2011 | Bernasconi et al. | |
| 2011/0064415 A1 | 3/2011 | Williams et al. | |
| 2012/0087613 A1 | 4/2012 | Rasras | |
| 2012/0207428 A1 | 8/2012 | Roelkens | |
| 2012/0213531 A1 | 8/2012 | Nazarathy et al. | |
| 2013/0107667 A1* | 5/2013 | Boufounos | G01S 15/89 367/99 |
| 2015/0009068 A1 | 1/2015 | Gregoire et al. | |
| 2015/0198713 A1* | 7/2015 | Boufounos | G01S 13/888 342/22 |
| 2015/0336097 A1 | 11/2015 | Wang et al. | |
| 2015/0357710 A1 | 12/2015 | Li et al. | |
| 2016/0091368 A1* | 3/2016 | Fish | G02B 6/34 356/328 |
| 2016/0170141 A1 | 6/2016 | Luo et al. | |
| 2016/0172767 A1* | 6/2016 | Ray | G06F 17/5063 343/893 |
| 2016/0266414 A1 | 9/2016 | Gill et al. | |
| 2016/0276803 A1 | 9/2016 | Uesaka | |
| 2016/0285172 A1* | 9/2016 | Kishigami | H01Q 21/08 |
| 2017/0041068 A1 | 2/2017 | Murakowski et al. | |
| 2017/0131576 A1 | 5/2017 | Gill et al. | |
| 2017/0279537 A1 | 9/2017 | Kim et al. | |
| 2017/0315387 A1 | 11/2017 | Watts et al. | |
| 2017/0324162 A1* | 11/2017 | Khachaturian | H01Q 3/2676 |
| 2018/0026721 A1* | 1/2018 | Bock | H04B 10/64 398/130 |
| 2018/0123699 A1 | 5/2018 | Fatemi et al. | |
| 2018/0101032 A1 | 6/2018 | Aflatouni et al. | |
| 2018/0101083 A1 | 6/2018 | Aflatouni et al. | |
| 2018/0173025 A1 | 6/2018 | McGreer et al. | |
| 2019/0056499 A1 | 2/2019 | Fatemi et al. | |
| 2021/0006333 A1 | 1/2021 | Morton et al. | |

FOREIGN PATENT DOCUMENTS

| | | |
|---|---|---|
| CN | 101889227 A | 11/2010 |
| CN | 101282175 B | 7/2012 |
| CN | 202915891 U | 5/2013 |
| CN | 105814483 A | 7/2016 |
| CN | 105917249 A | 8/2016 |
| EP | 3094987 B1 | 12/2018 |
| JP | H10500546 A | 1/1998 |
| JP | 2016535243 A | 11/2016 |
| WO | WO-2015105033 A1 | 7/2015 |
| WO | WO 2018/148758 A1 | 8/2018 |
| WO | WO 2018/165633 A1 | 9/2018 |

OTHER PUBLICATIONS

U.S. Appl. No. 15/616,844, Response to Non-Final Office Action filed Dec. 3, 2018.
U.S. Appl. No. 15/728,329, Final Office Action dated Aug. 3, 2018.
U.S. Appl. No. 15/728,329, Response to Non-Final Office Action filed Jul. 18, 2018.
Bliss, et al., "Multiple-Input Multiple-Output (MIMO) Radar and Imaging: Degrees of Freedom and Resolution," Signals, Systems, and Computers (Asilomar) Conference, pp. 54-59, (2003).
Bogaerts, et al., "Low-loss, low-cross-talk crossings for silicon-on-insulator nanophotonic waveguides," Optics Letters, 32(19): 2801-2803, (2007).
Katz, et al., "Diffraction coupled phase-locked semiconductor laser array," Appl. Phys. Lett., 42(7): 554-556, (1983).
Liang, et al., "Tiled-aperture coherent beam combining using optical phase-lock loops," Electronics Letters, 44(14), (2008).
Resler, et al., "High-efficiency liquid-crystal optical phased-array beam steering," Opt. Lett., 21(9): 689-691, (1996).
Vaidyanathan et al., "Sparse sensing with coprime arrays," Signals, Systems, and Computers (Asilomar) Conference, pp. 1405-1409, (2010).
U.S. Appl. No. 15/616,844, Non-Final Office Action dated Jun. 1, 2018.
U.S. Appl. No. 15/728,329, Non-Final Office Action dated Jan. 19, 2018.
WIPO Application No. PCT/US2018/018070, PCT International Search Report and Written Opinion of the International Searching Authority dated Apr. 27, 2018.
WIPO Application No. PCT/US2018/021882, PCT International Search Report and Written Opinion of the International Searching Authority dated Jun. 7, 2018.
U.S. Appl. No. 15/587,391, Non-Final Office Action dated Dec. 13, 2018.
U.S. Appl. No. 15/587,391, Non-Final Office Action dated Mar. 19, 2020.
U.S. Appl. No. 15/728,245, Final Office Action dated Dec. 6, 2019.
U.S. Appl. No. 15/587,391, Final Office Action dated Aug. 15, 2019.
U.S. Appl. No. 15/616,844, Notice of Allowance dated Mar. 27, 2019.
U.S. Appl. No. 15/728,245, Non-Final Office Action dated Apr. 17, 2019.

(56) References Cited

OTHER PUBLICATIONS

U.S. Appl. No. 15/728,329, Non-Final Office Action dated Jan. 30, 2019.
U.S. Appl. No. 15/728,329, Non-Final Office Action dated Sep. 9, 2019.
WIPO Application No. PCT/US2018/018070, PCT International Preliminary Report on Patentability dated Aug. 13, 2019.
WIPO Application No. PCT/US2018/021882, PCT International Preliminary Report on Patentability dated Sep. 10, 2019.
U.S. Appl. No. 15/728,245, Non-Final Office Action dated Jun. 29, 2020.
U.S. Appl. No. 15/728,329, Notice of Allowance dated Jun. 12, 2020.
U.S. Appl. No. 15/896,005, Ex Parte Quayle Action dated Apr. 29, 2020.
EP 18764449.7 Extended Suroepean Search Report dated Nov. 24, 2020.
U.S. Appl. No. 15/728,245, Non-Final Office Action dated Mar. 2, 2021.
JP Office Action dated Jan. 4, 2022, in Application No. JP2019-543993 with English translation.
Chinese Notice of Allowance dated Jun. 3, 2021, for Chinese Patent Application No. 201880016993.8 (with English translation).
Chinese Office Action/Examination Report dated Sep. 2, 2020, for Chinese Patent Application No. 201880016993.8 (with English translation).
U.S. Final Office Action dated Oct. 2, 2020 issued in U.S. Appl. No. 15/587,391.
U.S. Non-Final Office Action dated Jun. 17, 2021 issued in U.S. Appl. No. 15/587,391.
U.S. Notice of Allowance dated Sep. 27, 2021 issued in U.S. Appl. No. 15/728,245.
U.S. Notice of Allowance dated Nov. 2, 2020 issued in U.S. Appl. No. 15/896,005.
U.S. Notice of Allowance dated Jan. 3, 2022, in U.S. Appl. No. 15/587,391.

* cited by examiner

US 11,336,373 B2

CO-PRIME OPTICAL TRANSCEIVER ARRAY

CROSS REFERENCE TO RELATED APPLICATIONS

The present application claims benefit under 35 USC 119(e) of Application Ser. No. 62/469,106 filed Mar. 9, 2017, the content of which is incorporated herein by reference in its entirety.

FIELD OF THE INVENTION

The present invention relates to silicon photonics, and more particularly to optical phased arrays.

BACKGROUND OF THE INVENTION

Optical phased array receivers are used in detecting light arriving from a given direction. Optical phased array transmitters are used in shaping and steering a narrow, low-divergence, beam of light over a relatively wide angle. An integrated optical phased array photonics chip often includes a number of components such as lasers, photodiodes, optical modulators, optical interconnects, transmitters and receivers.

Optical phased arrays have been used in 3D imaging, mapping, ranging remote sensing, actuation projection system, data communication, and other emerging technologies such as autonomous cars and drone navigation. A need continues to exist for improvements to optical phased arrays.

BRIEF SUMMARY OF THE INVENTION

A co-prime transceiver, in accordance with one embodiment of the present invention, includes in part, a transmitter array having a multitude of transmitting elements wherein a distance between each pair of adjacent transmitting elements is defined by a first integer multiple of the whole or fraction of the wavelength of an optical signal, and a receiver array having a multitude of receiving elements in which the distance between each pair of adjacent receiving elements is a second integer multiple of the whole or fraction of the wavelength of the optical signal. The first and second integers are co-prime numbers with respect to one another.

In one embodiment, the transmitter and receiver arrays are one-dimensional arrays. In another embodiment, the receiver and transmitter arrays are two-dimensional arrays disposed symmetrically along a Cartesian coordinate system. In one embodiment A co-prime transceiver, in accordance with one embodiment of the present invention, includes in part, a transmitter array having a multitude of transmitting elements disposed symmetrically along the periphery of a first set of one or more concentric circles, and a receiver array having a multitude of receiving elements disposed symmetrically along the periphery of a second set of one or more concentric circles. The radiation pattern of the transmitter array and a response pattern of the receiver array overlap at substantially a single point in space.

A co-prime transceiver, in accordance with one embodiment of the present invention, includes in part, a transmitter array having a multitude of transmitting elements disposed symmetrically along the periphery of a first set of one or more concentric circles, and a receiver array having a multitude of receiving elements disposed symmetrically along the periphery of a second set of one or more concentric circles. The number as well as positions of the transmitting and receiving elements are selected such that a far-field radiation pattern of the transmitter array and a far-field response pattern of the receiver array overlap only along their main beams.

A method of transmitting and receiving an optical signal, in accordance with one embodiment of the present invention, includes in part, transmitting the optical signal via a transmitter array that includes a multitude of transmitting elements in which the distance between each pair of adjacent transmitting elements is defined by a first integer multiple of a whole or fraction of the wavelength of an optical signal. The method further includes receiving the optical signal via a receiver array that includes a multitude of receiving elements in which the distance between each pair of adjacent receiving elements is a second integer multiple of the whole or fraction of the wavelength of the optical signal. The first and second integer multiples are co-prime numbers with respect to one another.

In one embodiment, each of the transmitter and receiver arrays are one-dimensional arrays. In another embodiment, each of the transmitter and receiver arrays are two-dimensional arrays disposed symmetrically along a Cartesian coordinate system.

A method of transmitting and receiving an optical signal, in accordance with one embodiment of the present invention, includes in part, transmitting the optical signal via a transmitter array that includes a multitude of transmitting elements disposed symmetrically along the periphery of a first set of one or more concentric circles. The method further includes receiving the optical signal via a receiver array that includes a multitude of receiving elements disposed symmetrically along the periphery of a second set of one or more concentric circles. The radiation pattern of the transmitter array and a response pattern of the receiver array overlap at substantially a single point in space.

A method of transmitting and receiving an optical signal, in accordance with one embodiment of the present invention, includes in part, transmitting the optical signal via a transmitter array that includes a multitude of transmitting elements disposed symmetrically along the periphery of a first set of one or more concentric circles. The method further includes receiving the optical signal via a receiver array that includes a multitude of receiving elements disposed symmetrically along the periphery of a second set of one or more concentric circles. The number as well as positions of the transmitting and receiving elements are selected such that a far-field radiation pattern of the transmitter array and a far-field response pattern of the receiver array overlap only along their main beams.

DETAILED DESCRIPTION OF THE INVENTION

Figure 1:
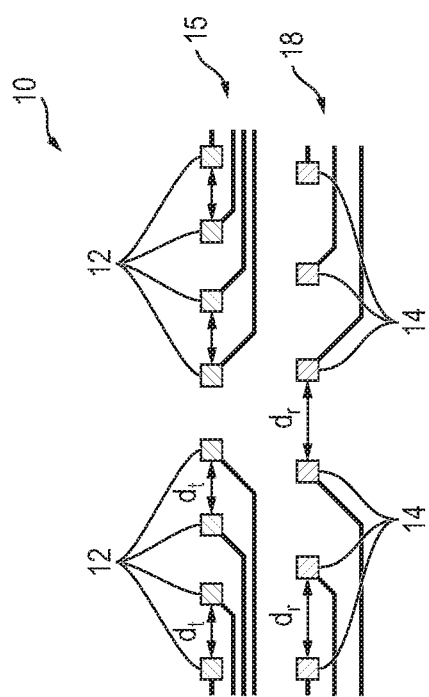
FIG. 1 is a simplified top-level schematic view of an exemplary one-dimensional co-prime transceiver array, in accordance with one embodiment of the present invention.

Embodiments of the present invention include a co-prime optical phased array transceiver. The spacing of the receiver and/or transmitter array elements is used to provide flexibility and enhance optical routing, thereby improving performance. The spacing also increases the receiver and/or transmitter aperture size compared to a uniformly arranged and distributed array of receiving and/or transmitting elements. However, the spacing of the elements in the transmitter and the receiver results in grating lobes in the response of both the transmitter and the receiver and reducing the usable field-of-view of the transmitter and the receiver to the spacing between two adjacent grating lobes. In accordance with embodiments of the present invention, the transmitter and receiver array element spacing are designed such that the combined system achieves an improved performance and a large field-of-view compared to individual performance of the transmitter and receiver array. Consequently, in accordance with the embodiments of the present invention, the beam-width, the magnitude of side lobes, grating lobes, and other characteristics of the beam can be controlled and modified to further enhance performance of the phased array transceiver.

An optical phased array receiver captures the incident light by its aperture—formed using an array of receiving elements—and processes it to determine, among other things, the direction of the incident light, or to look at the light coming from specific points or directions and suppress light from other points and directions.

Assume an optical co-prime transceiver with a receiver having $N_{rx} \geq 2$ receiving elements and a transmitter having $N_{tx} \geq 2$ transmitting elements, in accordance with one embodiment of the present invention. The spacing $d_{rx}$ between each pair of adjacent receiving elements is defined by $d_{rx} = n_{rx} d_x$, where $d_x$ is a unit spacing determined by the minimum optical routing spacing. The spacing $d_{tx}$ between each pair of adjacent transmitting elements is defined by $d_{tx} = n_{tx} d_x$ spacing. Because in a co-prime transceiver, in accordance with embodiments of the present invention, $n_{rx}$ and $n_{tx}$ are co-prime numbers with respect to each other, the co-prime transceiver has a performance that is equivalent to that of a conventional transceiver having $N_{rx} N_{tx}$ receiving-transmitting elements with uniform $d_x$ spacing. Side-lobe rejection is known to improve with increasing number of receiving-transmitting elements.

A conventional uniform transmitter or receiver array with N transmitting or receiving elements and transmitting/receiving element spacing of $d_x$ reconstructs the $$\left[-\frac{\pi}{2}, \frac{\pi}{2}\right]$$

field of view image up to spatial frequency resolution bandwidth given by the largest spacing of $x_N = N d_x$ if $d_x = \lambda/2$, where $\lambda$ is the wavelength of the optical signal. However, the unit spacing of $\lambda/2$ is difficult to achieve due to planar routing constraints. Increasing the inter-element spacing beyond $\lambda/2$ to attain improve resolution results in reduction of the field-of-view. A co-prime transceiver achieves improved resolution without sacrificing the field-of-view with a reduced number of elements.

An optical co-prime transceiver having M transmitting elements and N receiving elements achieves a performance that is equivalent to that of conventional transceiver having MN transmitting-receiving elements. Such a co-prime transceiver not only requires fewer number of transmitting-receiving elements, it achieves side-lobes that are considerably lower. By increasing the number of elements in the transmitter and receiver, a narrower beam and thus lower side-lobes are obtained. In one example, a co-prime transceiver with 2(N+M) transmitting-receiving elements can have side-lobes that are much lower compared to a conventional uniform transceiver. Increasing the number of transmitter and receiver elements while keeping the distance of the transmitter and receiver elements constant results in improved performance for the co-prime array as it does for a uniform array.

In accordance with one embodiment of the present invention, the distance between each pair of adjacent transmitting elements of a co-prime phased array transceiver is defined by a first integer multiple T of a distance $d_x$ (i.e., $Td_x$), and the distance between each pair of adjacent receiving elements of the co-prime phased array transceiver is defined by a second integer multiple R of the distance $d_x$ (i.e., $Rd_x$), wherein T and R are co-prime numbers with respect to one another. The number of transmitting elements of the co-prime transceiver is P and the number of receiving elements of the co-prime transceiver is Q, where P and Q are integers greater than or equal to two, and $d_x$ may be equal to either $\lambda$, $$\frac{\lambda}{2}, \frac{\lambda}{4}$$

or any other real factor of $\lambda$—the wavelength of the optical signal being used. A co-prime phased array transceiver, in accordance with embodiments of the present invention, therefore has more relaxed routing constraints. The higher the number of transmitter and receiver elements, the larger the spacing between the receiver elements and the spacing between the transmitter elements can be to permit signal routing to the elements in two-dimensions.

A one-dimensional co-prime transceiver with P transmitting elements and Q receiving elements has a performance characteristics that is substantially equivalent to that of a conventional uniform transceiver having PQ transmitting-receiving elements. Similarly, a two-dimensional co-prime transceiver with 2P transmitting elements and 2Q receiving elements has a performance characteristics that is substantially equivalent to that of a conventional uniform transceiver having $16(PQ)^2$ transmitting-receiving elements.

FIG. 1 is a simplified top-level schematic view of an exemplary one-dimensional co-prime transceiver array 10 shown as having 8 transmitting elements 12 and 6 receiving elements 14. Transmitting elements 12 are shown as forming a transmitting array 15, and receiving elements 14 are shown as forming a receiving array 18. The distance $d_t$ between each pair of adjacent transmitting elements is assumed to be equal to $3d_x$ and the distance $d_r$ between each pair of adjacent receiving elements is assumed to be equal to $4d_x$, where $d_x$ is assumed to be equal to half the wavelength of the light, namely $$\frac{\lambda}{2}.$$

Figure 2A:
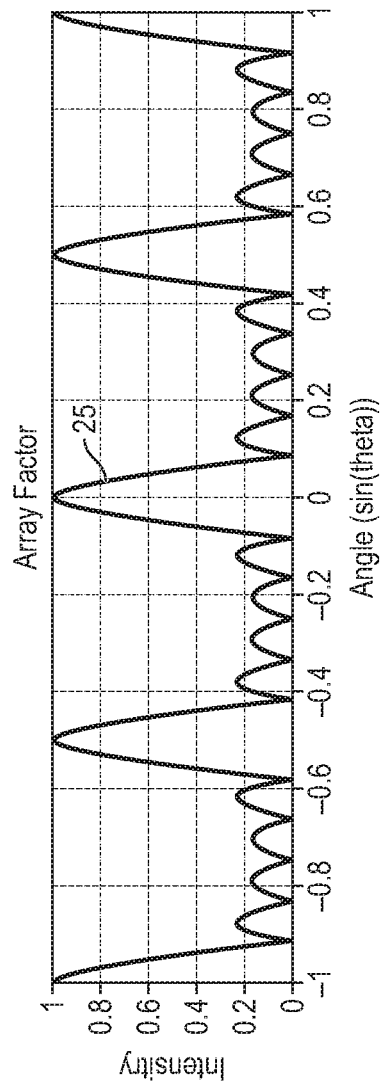
FIG. 2A shows computer simulation response of transmitter array of the transceiver of FIG. 1, in accordance with one embodiment of the present invention.
Figure 2B:
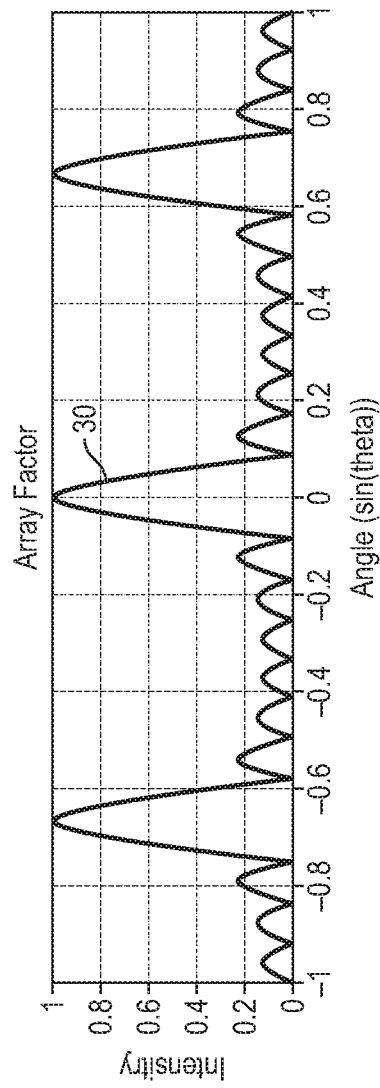
FIG. 2B shows computer simulation response of the receiver array of the transceiver of FIG. 1, in accordance with one embodiment of the present invention.
Figure 2C:
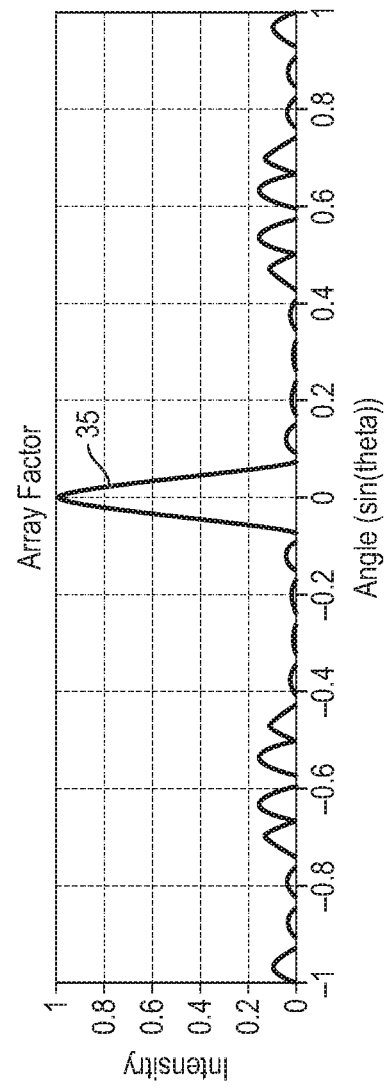
FIG. 2C shows computer simulation response of the transceiver of FIG. 1, in accordance with one embodiment of the present invention.

Plot 25 of FIG. 2A shows computer simulation response of transmitter array 15 of FIG. 1 and plot 30 of FIG. 2B shows computer simulation response of receiver array 18 of FIG. 1. Plot 35 of FIG. 2C shows computer simulation response of transceiver array 10 of FIG. 1. The transmitter array is shown as illuminating 5 directions in FIG. 2A and the receiver array is shown as collecting light from 3 directions. However, at any given time only one of the transmitter and receiver beams align and the transceiver behaves as if there is only one transmitter and one receiver illuminating and receiving from the same direction.

Despite the fact that the transmitter array and receiver array each have several side-lobes, their combined response rejects all the side-lobes. Sliding the response of the transmitter array across the response of the receiver array shows that at any arbitrary angle, their combined response has a minimum side-lobe. As seen from FIG. 2B, transceiver array 10 has a peak response at 0° angle and has substantially the same response characteristics as a conventional uniform transceiver with 8×6=48 (the product of the number of transmitting elements and the number of receiving elements of the co-prime transceiver in accordance with embodiments of the present invention) receiver elements, and a single transmitting element, or 48 transmitters and a single receiver.

Figure 3:
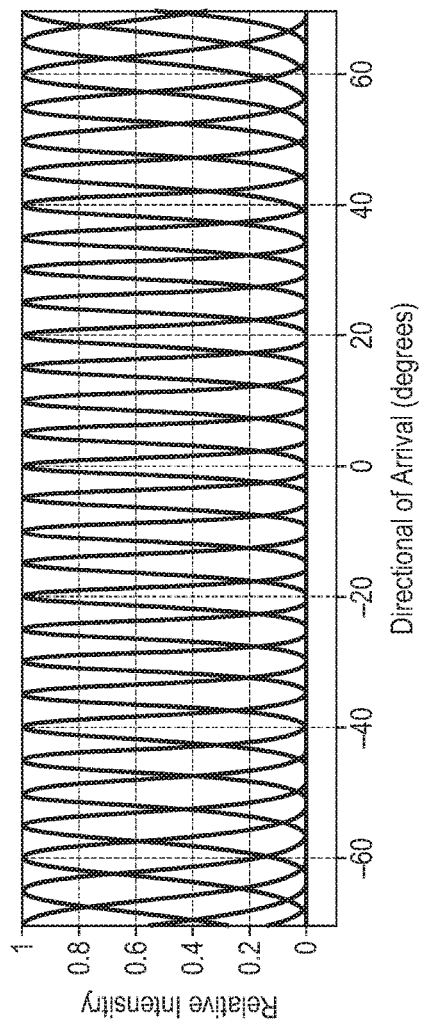
FIG. 3 shows computer simulation response of the transceiver of FIG. 1 along different angular directions, in accordance with one embodiment of the present invention.

Sweeping the transceiver phased-array to acquire signal from all directions results in the response shown in FIG. 3. As seen from FIG. 3, the co-prime receiver array maintains a desirable side-lobe rejection ratio when acquiring signal from any given direction.

Figure 4:
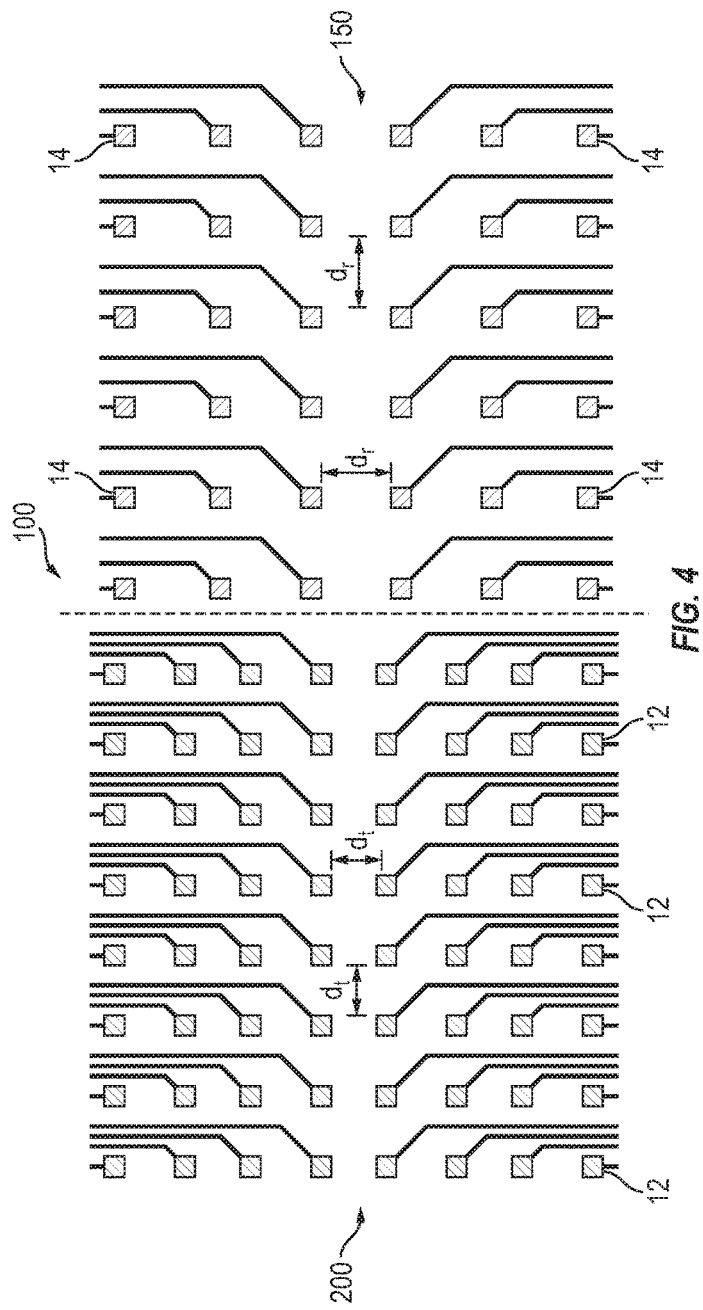
FIG. 4 is a simplified top-level schematic view of an exemplary two-dimensional co-prime transceiver array, in accordance with one embodiment of the present invention.

FIG. 4 is a simplified top-level schematic view of an exemplary two-dimensional co-prime transceiver phased array 100, in accordance with another exemplary embodiment of the present invention. Co-prime transceiver array 100 is shown as having a receiver array 150 and a transmitter array 200. Receiver array 150 is shown as having 36 receiving elements 14 and transmitter array 200 is shown as having 64 transmitting elements 12. The distance $d_r$ between each pair of adjacent receiving elements 14 is assumed to be $4d_x$, and the distance $d_t$ between each pair of adjacent transmitting elements 12 is assumed to be $3d_x$, where $d_x$ is assumed to be equal to the wavelength of the light used by the transceiver phased array 100. Receiver array 150 is shown as having 36 receiving elements and transmitter array 200 is shown as having 64 element. Accordingly, in co-prime transceiver phased array 100, parameter P is equal to 64 and parameter Q is equal to 36.

Figure 5:
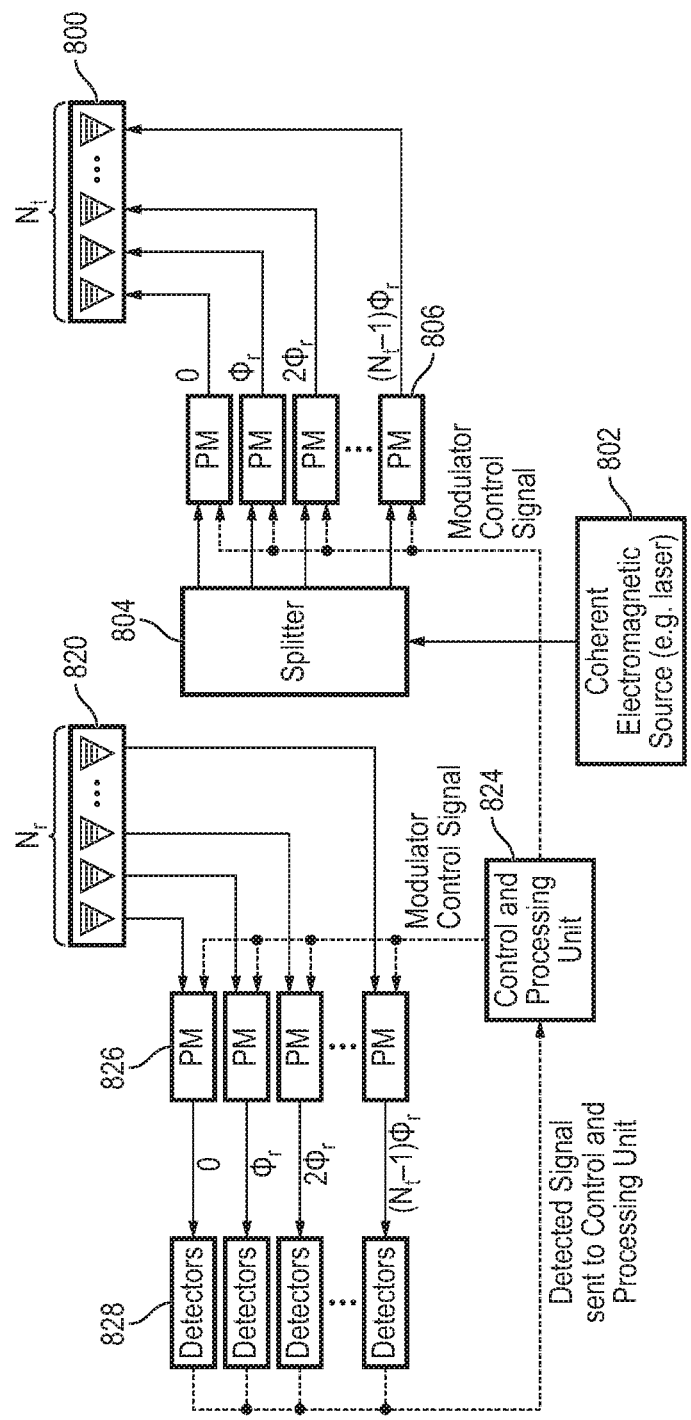
FIG. 5 is a simplified schematic block diagram of a one-dimensional transceiver array, in accordance with one exemplary embodiment of the present invention.

FIG. 5 is a simplified schematic block diagram of a one-dimensional transceiver array having N transmitters $N_t$ and receivers $N_r$. The optical signal generated by coherent electromagnetic source 802 is split into N signals by splitter 804, each of which is phase modulated by a different one of phase modulators (PM) 806 and transmitted by a different one of the transmitters, collectively identified using reference number 800. The signals received by receiving elements 820 are modulated in phase by PMs 826 and detected by detectors 828. The output signals of the detectors is received by control and processing unit 824 which, in turn, controls the phases of PMs 806 and 826.

A co-prime transmitter and receiver pair will each have several side-lobes. However, their combined radiation pattern will only have one main lobe. Each transmitter and receiver need to be set such that the relative phase between the elements is linearly increasing. Assume that the relative phase steps of the transmitters is $\phi_t$ and relative phase step of receivers is $\phi_r$. As a result, the transmitter and receiver phased array will have the center-lobe pointing in a specific direction which are uncorrelated with respect to each other. However, their combined radiation pattern will have one main lobe. If $\phi_t$ and $\phi_r$ are swept from zero to $2\pi$, the combined main-lobe will be swept across the field of view as well. The combined main-lobe has the maximum amplitude when any two of the transmitter and receiver main lobe are aligned in substantially the same direction.

Therefore, by setting a linear phase delay step between the elements of each of the transmitters and the receivers, and slowly varying the phase delay step of either the transmitters or the receivers, a co-prime phased array that has a single main lobe and can sweep the entire field of view is achieved.

In the one-dimensional array shown in FIG. 5, the control and processing unit 802 adjusts the relative phase between the elements using the phase modulators such that the receiver elements have linear relative phase difference of (0, $\phi_r$, $2\phi_r$, $3\phi_r$, . . . , $(N_r-1)\phi_r$) and the transmitter elements have linear relative phase difference of (0, $\phi_t$, $2\phi_t$, $3\phi_t$, . . . , $(N_t-1)\phi_t$). It is understood that $\phi_r$, $\phi_t$ can have any value in the range of $[0,2\pi]$.

Figure 6:
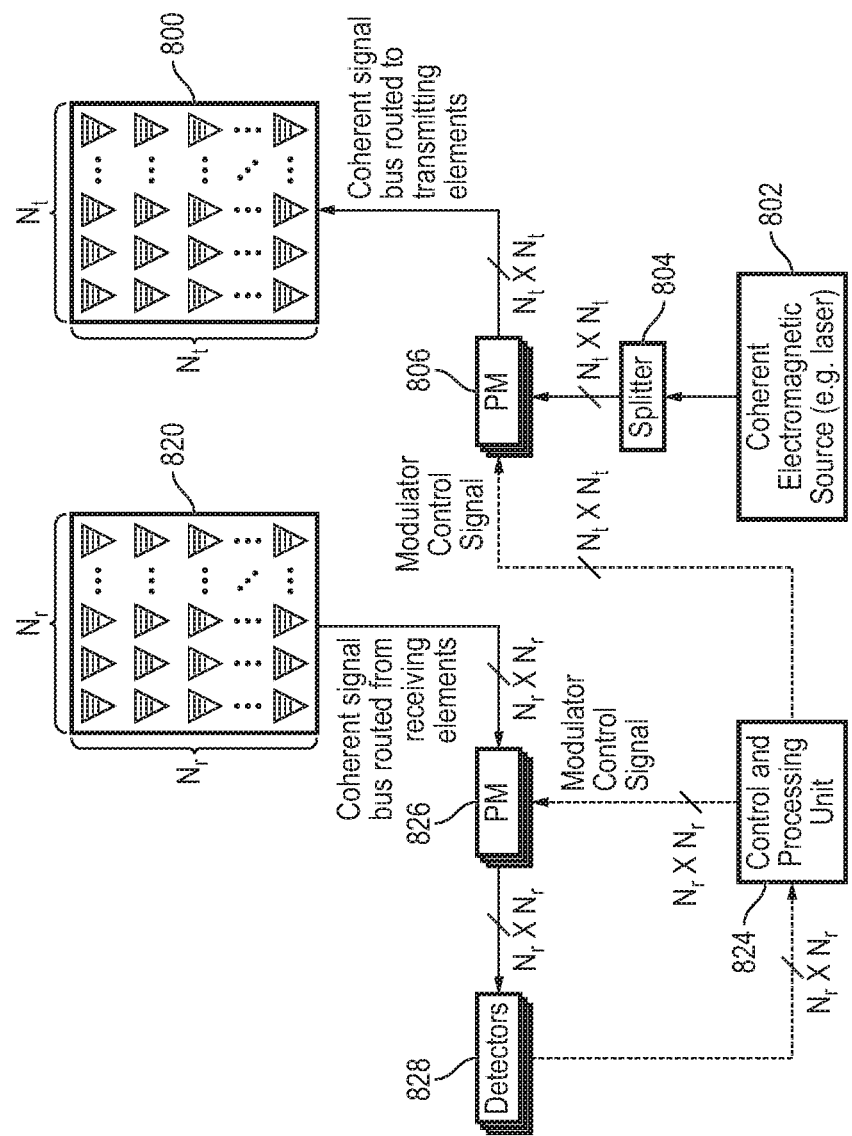
FIG. 6 is a homodyne two-dimensional phased array, in accordance with one exemplary embodiment of the present invention.

FIG. 6 is a simplified schematic block diagram of a two-dimensional transceiver array having an array of $N_t \times N_t$ transmitters and an array of $N_r \times N_r$ receivers. The two-dimensional transceiver shown in FIG. 6 has a homodyne architecture but is otherwise similar to the one-dimensional transceiver shown in FIG. 5.

Figure 7:
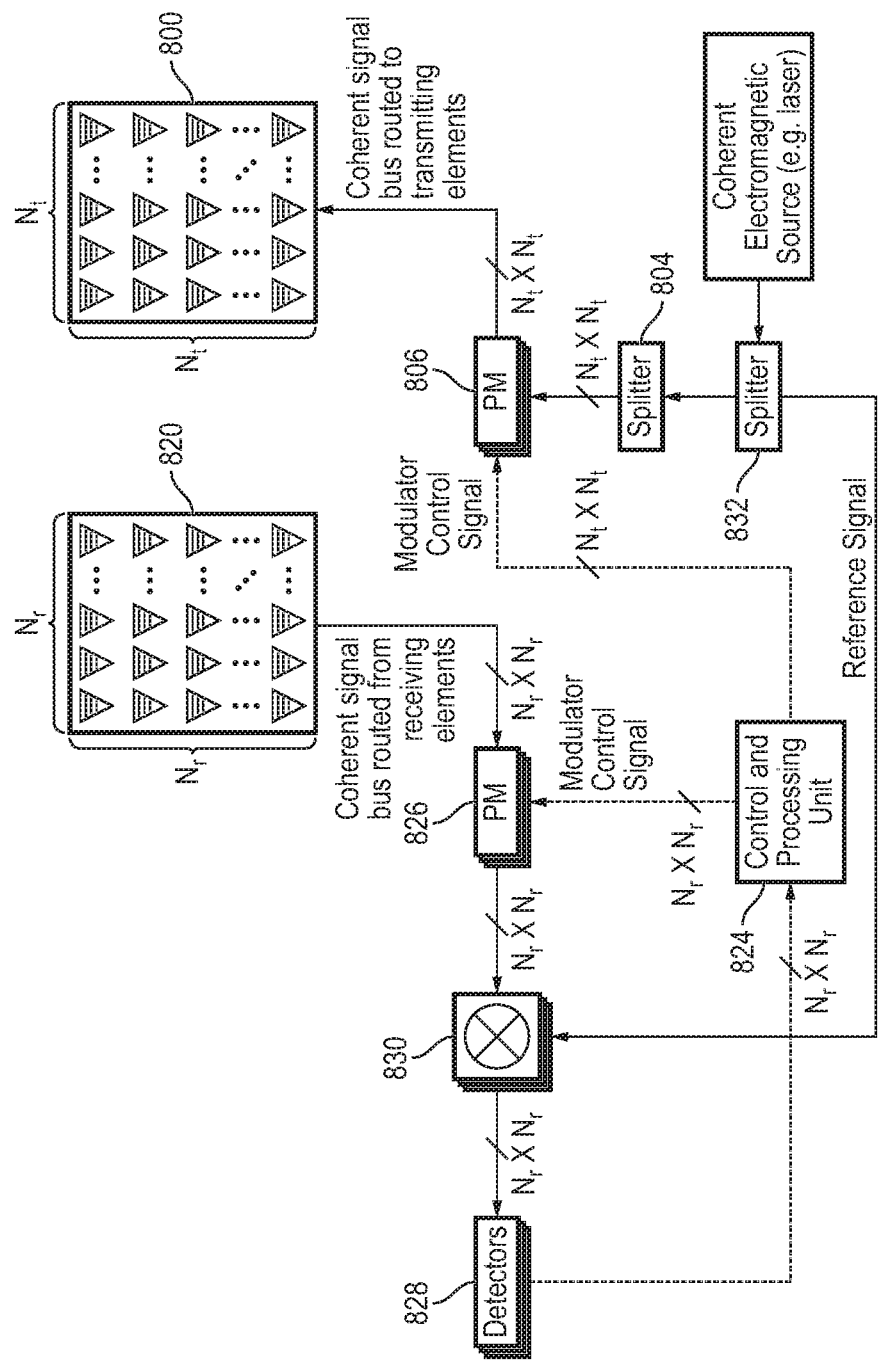
FIG. 7 is a heterodyne two-dimensional phased array, in accordance with one exemplary embodiment of the present invention.

FIG. 7 is a simplified schematic block diagram of a heterodyne two-dimensional transceiver array having an array of $N_t \times N_t$ transmitters and an array of $N_r \times N_r$ receivers. The two-dimensional transceiver architecture shown in FIG. 7 is also shown as including an additional splitter 832 and a multitude of mixers 830. The signal detection scheme described above is also applicable to both homodyne as well as heterodyne array architectures.

Figure 8:
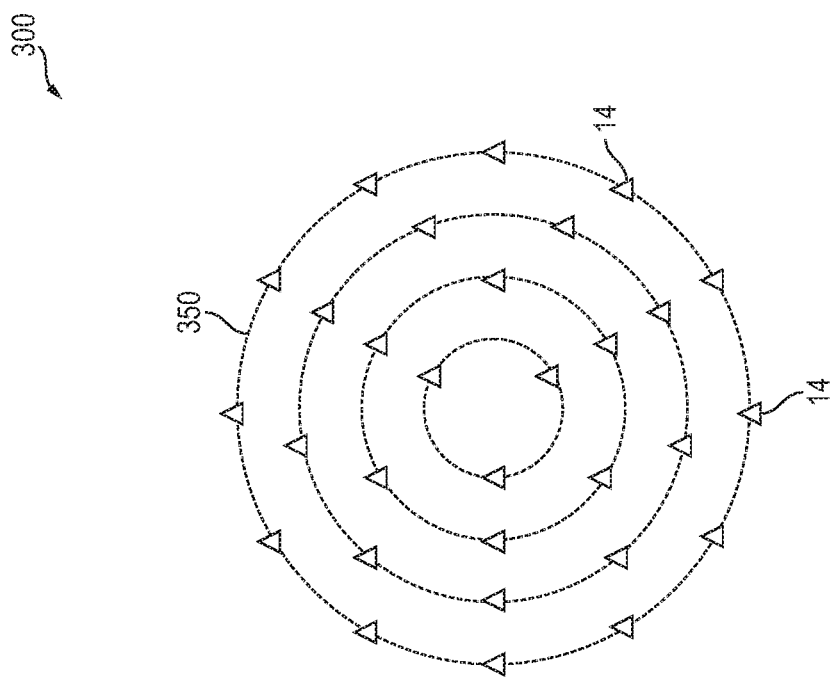
FIG. 8 is a simplified top-level schematic view of an exemplary two-dimensional co-prime transceiver array, in accordance with one embodiment of the present invention.
Figure 8:
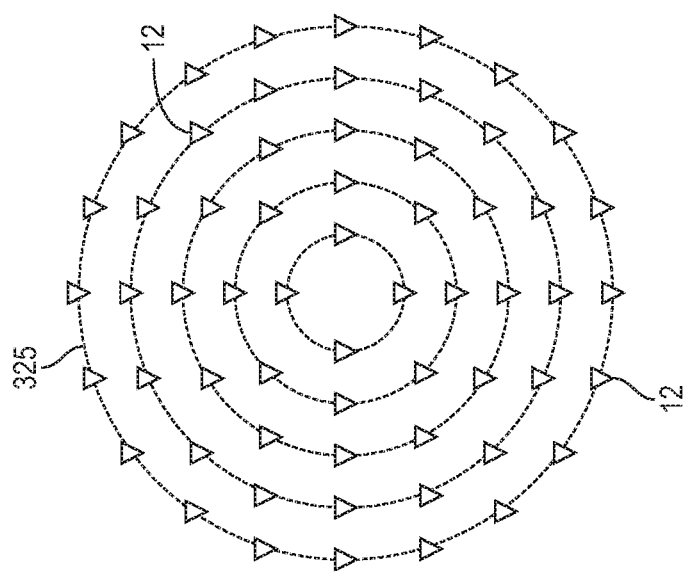

In accordance with another embodiment of the present invention, the array elements are symmetrical in a polar coordinate system. FIG. 8 is a simplified top-level schematic view of an exemplary two-dimensional co-prime transceiver phased array 300, in accordance with another exemplary embodiment of the present invention. Co-prime transceiver array 300 is shown as having a receiver array 325 and a transmitter array 350. Receiver array 325 is shown as having 60 receiving elements 12, and transmitter array 350 is shown as having 30 transmitting elements 14.

Operation wavelength of the exemplary transceiver 300 is 1550 nm. Transmitter array 350 is further shown as having 4 rings of radiators. The rings from the most inner ring to the most outer rings have 3, 6, 9, 12 radiating elements placed on concentric circles with 6 um, 12 um, 18 um, 24 um radii respectively. The receiver array 325 is shown as having 5 concentric rings of receiving elements. The rings from the most inner ring to the most outer rings have 4, 8, 12, 16, and 20 elements placed on concentric circles with radii of 13 um, 26 um, 39 um, 52 um, and 65 um respectively.

In the embodiment shown in FIG. 8, the transmitter and receiver array beams overlap at a single point in space. The relative spacing between the transmitting elements and the receiving determine the far-field radiation pattern associated with the phased array 300. The relative spacing between the transmitting and receiving elements may be assigned arbitrary or based on a uniform element placement so long as the transmitter and receiver radiation patterns overlap at substantially a single point in space.

Figure 9A:
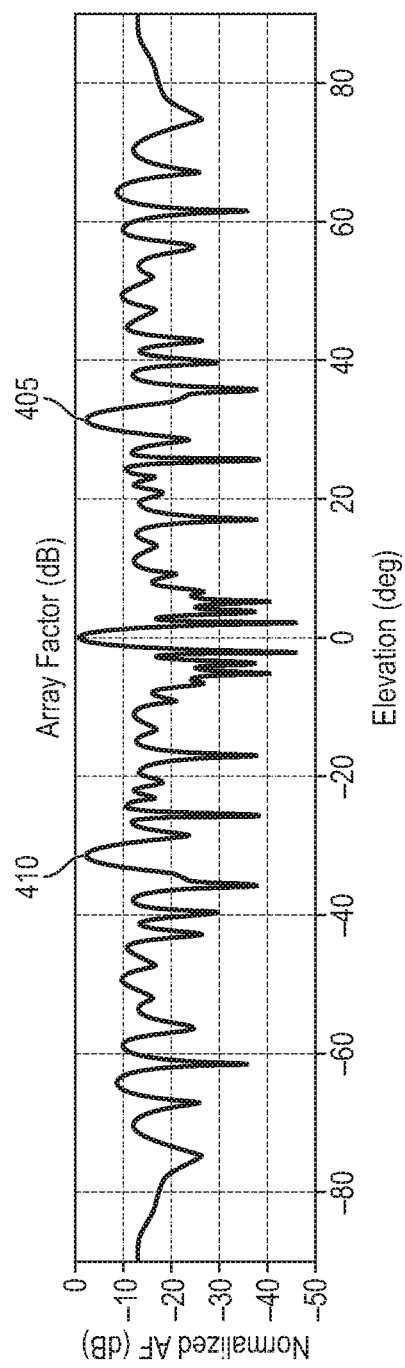
FIG. 9A shows computer simulation of the transmission pattern of the transmitting array of the transceiver of FIG. 8 in a Cartesian coordinate system.
Figure 9B:
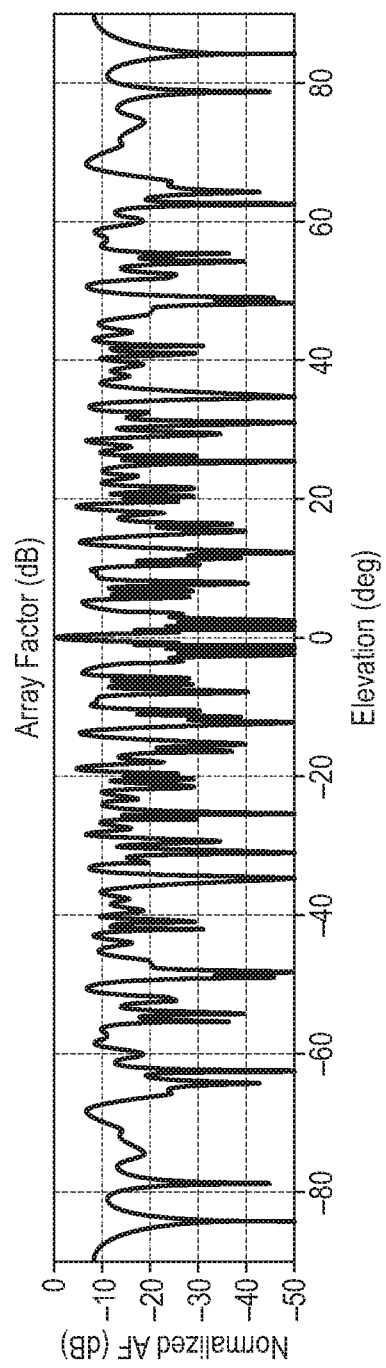
FIG. 9B shows computer simulation of the response characteristics of the receiver array of the transceiver of FIG. 8 in a Cartesian coordinate system.

FIG. 9A shows the transmission pattern of array 300 of transceiver 300 assuming isotropic transmitting elements are used. As is seen from FIG. 9A, the transmission patterns has two grating lobes 405, 410. FIG. 9B shows the far-field response pattern of the receiver array 325 of transceiver 300. Several strong side-lobes with amplitudes 5 dB lower than peak-power are present in FIG. 9B.

Figure 9C:
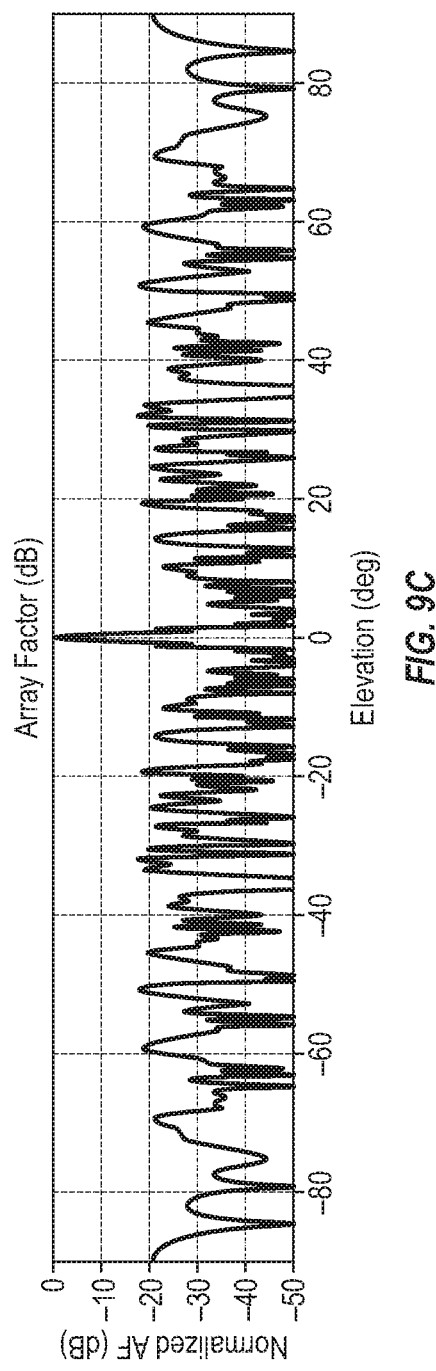
FIG. 9C shows computer simulations of the characteristics of the phased array of FIG. 8 in a Cartesian coordinate system.

FIG. 9C shows the radiation pattern of transceiver 300 which is the product of the patterns shown in FIGS. 14A and 14B. As is seen from FIG. 9C, the radiation pattern of transceiver 300 suppresses the strong grating lobes of the transmitter and attenuates the strong side-lobes of the receiver resulting in a system radiating pattern that outperforms the patterns of both the transmitter and the receiver taken individually. As is seen, the transmitter and receiver beam-pattern overlap only in the broadside direction along the zero angle.

The above embodiments of the present invention are illustrative and not limitative. The embodiments of the present invention are not limited by the aperture size or the number of elements in the array of transmitters or receivers. The above embodiments of the present invention are not limited by the wavelength of the light. The above embodiments of the present invention are not limited by the number of semiconductor substrates that may be used to form a transmitter, receiver or transceiver array. Other modifications and variations will be apparent to those skilled in the art and are intended to fall within the scope of the appended claims.

What is claimed is:

1. A co-prime optical transceiver comprising:
   a transmitter array comprising a plurality of transmitting elements wherein a distance between each pair of adjacent transmitting elements is defined by a first integer multiple of a length characterized by a wavelength of an optical signal; and
   a receiver array comprising a plurality of receiving elements wherein a distance between each pair of adjacent receiving elements is a second integer multiple of a length defined by the length, wherein said first and second integers are co-prime numbers with respect to one another;
   a plurality of detectors adapted to detect a signal received by the receiver array to generate a plurality of detected signals; and
   a plurality of phase modulators adapted to control phases of signals transmitted by the transmitted array in accordance with the plurality of the detected signals, wherein each of said transmitter and receiver arrays are two-dimensional arrays disposed symmetrically along a Cartesian coordinate system.

2. The transceiver array of claim 1 wherein said length is a fraction of the wavelength the optical signal.

3. A method of transmitting and receiving an optical signal, the method comprising:
   transmitting the optical signal via a transmitter array comprising a plurality of transmitting elements wherein a distance between each pair of adjacent transmitting elements is defined by a first integer multiple of a length characterized by a wavelength of an optical signal;
   receiving the optical signal via a receiver array comprising a plurality of receiving elements wherein a distance between each pair of adjacent receiving elements is a second integer multiple of a length defined by the length, wherein said first and second integers are co-prime numbers with respect to one another;
   detecting a signal received by the receiver array to generate a plurality of detected signals; and
   controlling phases of signals transmitted by the transmitted array in accordance with the detected signals, wherein each of said transmitter and receiver arrays are two-dimensional arrays disposed symmetrically along a Cartesian coordinate system.

4. The transceiver array of claim 3 wherein said length is a fraction of the wavelength of the optical signal.

* * * * *